F. FARNEY.
WAGON.
APPLICATION FILED FEB. 28, 1911.
996,323.
Patented June 27, 1911.
2 SHEETS—SHEET 2.
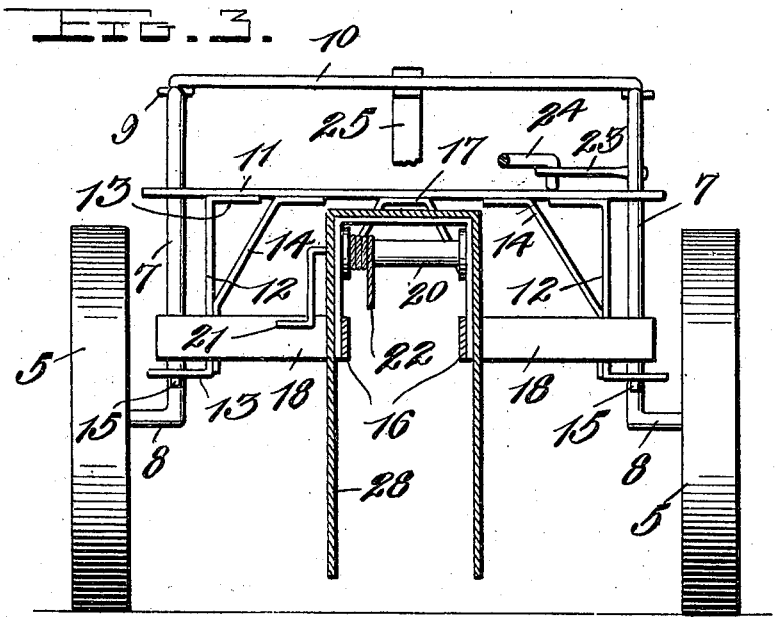
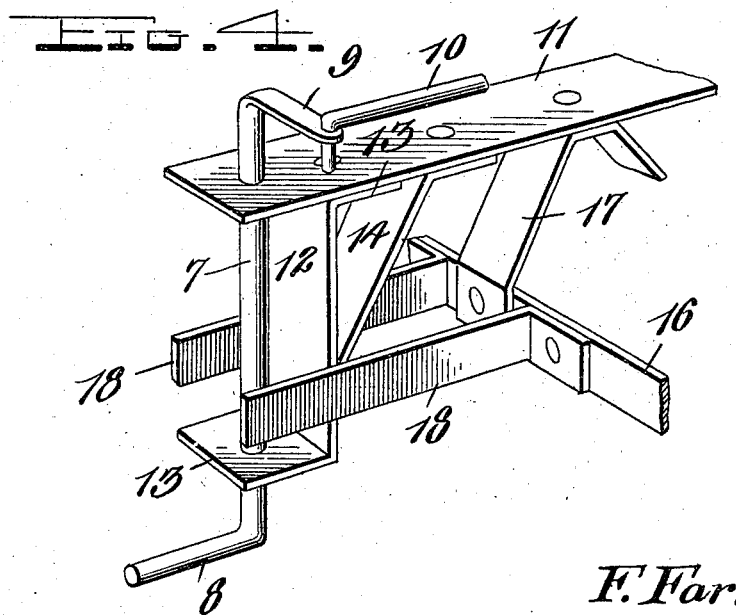
Witnesses
Chas. L. Griesbauer.
L. G. Ellis.
Inventor
F. Farney,
By Watson E. Coleman
Attorney

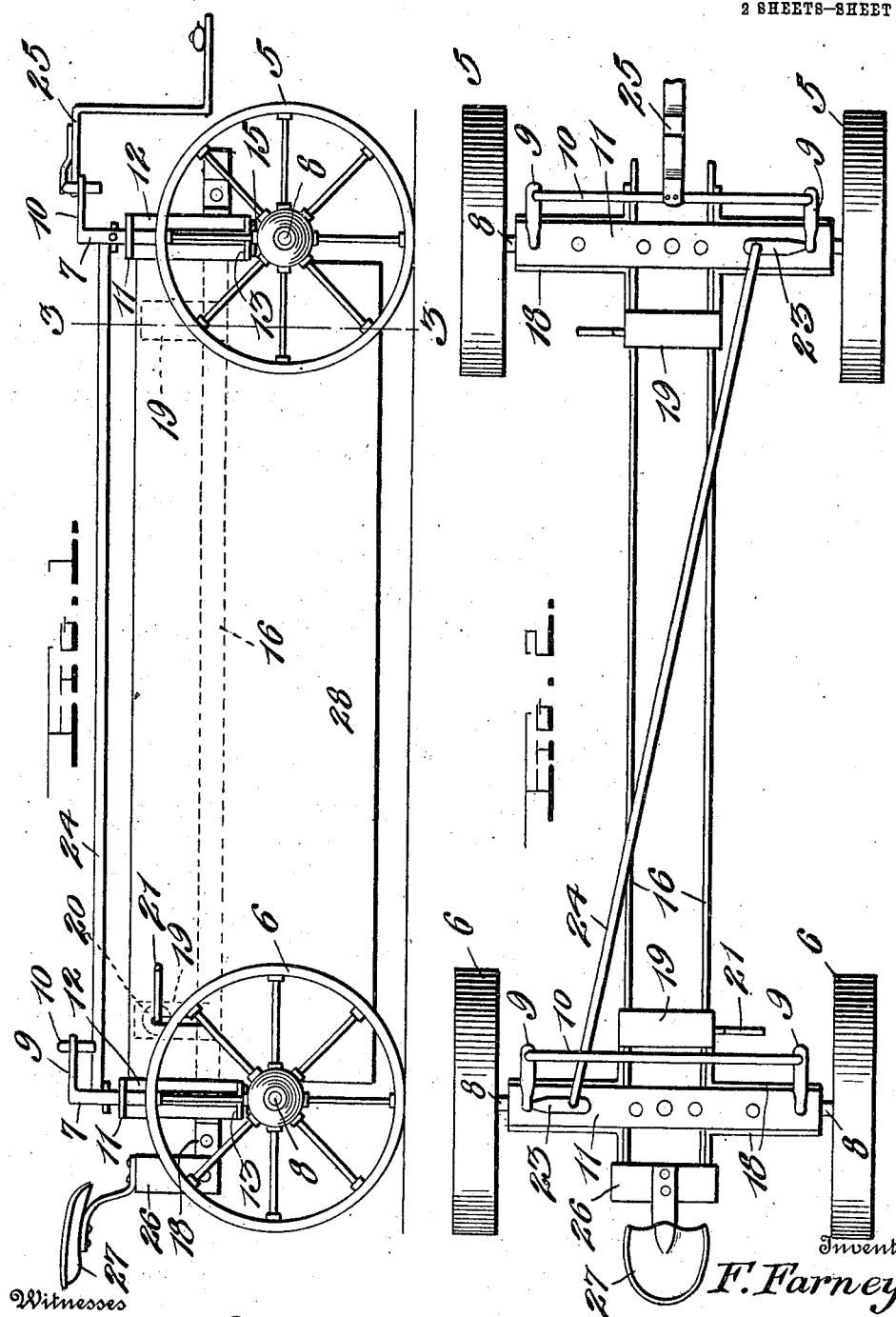

UNITED STATES PATENT OFFICE.

FRED FARNEY, OF FORREST, ILLINOIS.

WAGON.

996,323.   Specification of Letters Patent.   Patented June 27, 1911.

Application filed February 28, 1911. Serial No. 611,486.

*To all whom it may concern:*

Be it known that I, FRED FARNEY, a citizen of the United States, residing at Forrest, in the county of Livingston and State of Illinois, have invented certain new and useful Improvements in Wagons, of which the following is a specification, reference being had to the accompanying drawings.

This invention relates to wagons and more particularly to vehicles of that character which are used for transporting conveyer tubes from place to place, the invention having for its primary object the provision of means for easily and quickly arranging the conveyer in position on the wagon.

Another object of the invention is to provide means for turning or directing the rear supporting wheels simultaneously with the front wheels of the wagon.

Still another object of my invention resides in the provision of a frame structure which is extremely rigid and reliable, said frame having mounted thereon winding drums, and a longitudinal protecting cover arranged over the frame for the protection of the conveyer, said drums having cables thereon to be attached to the conveyer whereby the latter may be wound up into position beneath the frame.

With the above and other objects in view, the invention consists of the novel features of construction, combination and arrangement of parts hereinafter fully described and claimed, and illustrated in the accompanying drawings, in which—

Figure 1 is a side elevation of a wagon embodying my invention; Fig. 2 is a top plan view thereof; Fig. 3 is a section taken on the line 3—3 of Fig. 1; and Fig. 4 is a detail perspective view of one of the axle spindles and a fragment of the wagon frame.

Referring in detail to the drawings 5 designates the front wheels and 6 the rear wheels between which the frame structure which will be later set forth in detail is arranged and supported. These wheels are revolubly mounted upon the spindles 8 which are formed upon the lower ends of the vertically disposed rods 7. The upper ends of these rods are laterally extended as indicated at 9. These lateral extensions are connected by means of the rods 10.

The frame structure comprises the front and rear transverse bars 11 through which the vertical rods 7 are disposed. Vertical bars 12 have their ends bent at right angles as indicated at 13, one of which is rigidly secured to the under side of the cross bar 11. The lower angularly disposed end of the bar 12 has an opening therein through which the rod 7 extends. The front and rear frame members which are arranged upon the vertical wheel supporting rods 7 are identical in construction and the transverse bars 11 thereof are connected to the vertical bars 12 by means of the diagonal braces 14. Pins 15 are disposed through the rods 7 beneath the lower ends of the vertical bars 13 and upon these pins rest the entire weight of the vehicle frame. The parallel longitudinal body bars 16 extend beneath the bars 11 of the vertical end portions of the frame and are ridigly supported therefrom by means of the U-shaped bars 17 which are securely riveted, bolted or otherwise fastened to the bars 11. The ends of these U-shaped bars are similarly fixed to the respective frame bars 16. Transverse bars 18 are fixed at one of their ends to each of the longitudinal bars 16. These transverse bars are arranged in pairs and at their free ends are disposed upon opposite sides of the vertical bars 12 thereby relieving the fastening bolts or rivets of considerable strain and overcoming all tendency of the longitudinal movement of the bar 16, whereby a very rigid and substantial frame structure is produced. To the longitudinal bars 16 adjacent to the vertical frame portions, the ends of the yokes 19 are secured. In each of these yokes a drum 20 is rotatably mounted, a suitable crank 21 being provided whereby said drum is rotated. One end of a cable 22 is fixed to the drum and has a yoke on its other end for attachment to an eye secured to a conveyer over which the wagon is adapted to be positioned.

In one of the vertical wheel supporting rods 7 at each end of the wagon and upon opposite sides thereof, an arm 23 is secured. The ends of these arms are provided with openings to receive the hooked ends of a connecting rod 24. By means of this rod, the front and rear pairs of wheels are caused to turn in unison when the vehicle is rounding a curve. To the rod 10 which connects the upper ends of the front wheel rods 7, one end of the tongue 25 is secured. Upon this tongue the usual draft attachments to which the horses or other animals are to be connected are arranged. Upon the rear ends of the longitudinal frame bars 16 a vertical U-shaped bar 26 is fixed upon which a driver's seat 27 is mounted and secured in any preferred manner.

In order to provide a shield or protection for the conveyer as it is moved from place to place, I employ the cover 28 which extends the entire length of the frame between the vertical end portions thereof and rests upon the upper ends of the yokes 19 in which the drums 20 are mounted. This cover is substantially U-shaped in cross section and its side walls at opposite ends are provided with slots for the accommodation of the crank handles 21.

In the practical use of my improved wagon, conveyers such as are used for conveying corn from a crib to a shelling machine may be easily and quickly transported from place to place. Such conveyers are usually about 40 or 50 feet in length and are formed in three sections which are connected together in the use of the conveyer. When it is desired to move the conveyer it is necessary to disconnect the sections and transport them separately or place the separate sections in a wagon, the proportions of which will not accommodate the conveyer sections when connected together. By means of my improved wagon, however, it is unnecessary to disconnect the sections of the conveyer, the ends of the cables arranged upon the drums 20 being easily and quickly connected to suitable eyes on opposite ends of the conveyer, and the drums rotated to elevate the conveyer to a position beneath the longitudinal parallel bars 16 of the wagon frame and between the downwardly extending side portions of the protecting cover or hood 28. In this manner, the conveyer may be moved in its entirety from one place to another. The hood 28 also provides a complete protection for the conveyer in stormy weather. The construction of the machine as a whole is extremely strong and durable, and consists of comparatively few parts which may be easily and quickly repaired when necessary.

While I have shown and described the preferred construction and arrangement of the various parts, it will be understood that the invention is susceptible of considerable modification without departing from the essential feature or sacrificing any of the advantages thereof.

Having thus described the invention what is claimed is:—

1. In combination, front and rear vertical frame members, wheel supporting rods vertically disposed through the ends of said frame members and rotatable therein, wheels revolubly mounted on the lower ends of said rods, transverse rods connecting the upper ends of said wheel supporting rods, a draft tongue connected to the rod which connects the front wheel supporting rods, a horizontal rod connecting one of the front and rear wheel supporting rods on opposite sides of the machine, longitudinal frame bars mounted at their ends in the vertical frame members, and hoisting devices arranged upon said frame bars.

2. In combination, front and rear vertical frame members, wheel supporting rods rotatably mounted in the ends of said frame members, wheels revolubly mounted upon the lower ends of said rods, the upper ends of said wheel supporting rods being laterally extended, rods connecting the upper ends of said wheel supporting rods, a rod connecting one of the front and one of the rear wheel supporting rods on opposite sides of the machine to turn said wheels simultaneously with relation to the frame, longitudinal parallel body bars rigidly supported at their ends in the vertical frame members, winding drums mounted upon said body bars adjacent to the opposite ends thereof, and a protecting hood arranged over said body bars between the vertical frame members.

3. In combination, front and rear vertical frame members, supporting wheels for each of said members, means for simultaneously turning said supporting wheels to angularly position the same with relation to the frame members, parallel longitudinal body bars, U-shaped bars secured at their ends to the respective body bars and rigidly fixed to said vertical frame members, transverse pairs of bars fixed at one of their ends to the body bars at each end thereof and extending upon opposite sides of the vertical frame members, vertically disposed yoke bars arranged upon the parallel body bars, winding drums mounted in said yoke members, and a protecting hood extending between the vertical frame members and arranged upon said yoke bars, said hood having a slot in each end thereof to receive the winding cranks of the drums.

In testimony whereof I hereunto affix my signature in the presence of two witnesses.

FRED FARNEY.

Witnesses:
 ELMER E. VIRKLER,
 ROY SINGER.

---

Copies of this patent may be obtained for five cents each, by addressing the "Commissioner of Patents, Washington, D. C."